United States Patent
Yoshida et al.

(10) Patent No.: US 7,482,074 B2
(45) Date of Patent: Jan. 27, 2009

(54) FUEL CELL SYSTEM, MOBILE UNIT EQUIPPED WITH THE SYSTEM, AND CONTROL METHOD FOR THE FUEL CELL SYSTEM

(75) Inventors: Naohiro Yoshida, Okazaki (JP); Kenji Kurita, Nagoya (JP); Tomonori Yachi, Toyota (JP); Hideki Kashiwagi, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 459 days.

(21) Appl. No.: 10/535,094

(22) PCT Filed: Nov. 21, 2003

(86) PCT No.: PCT/IB03/05314

§ 371 (c)(1),
(2), (4) Date: May 16, 2005

(87) PCT Pub. No.: WO2004/049488

PCT Pub. Date: Jun. 10, 2004

(65) Prior Publication Data
US 2006/0003205 A1      Jan. 5, 2006

(30) Foreign Application Priority Data
Nov. 22, 2002    (JP)    ................... 2002-338675

(51) Int. Cl.
*H01M 8/00* (2006.01)
*H01M 8/12* (2006.01)

(52) U.S. Cl. .............. 429/13; 429/23; 429/25
(58) Field of Classification Search ............ 429/23, 429/25, 13
See application file for complete search history.

(56) References Cited

U.S. PATENT DOCUMENTS 6,393,354 B1 * 5/2002 Scheffler et al. ............ 701/99
6,406,805 B1   6/2002 James et al. ............... 429/13

FOREIGN PATENT DOCUMENTS

| EP | 0 827 226 A2 | 3/1998 |
| FR | 2 841 044 A1 | 12/2003 |
| GB | 1 534 015 | 10/1975 |
| JP | A 2001-307758 | 11/2001 |
| JP | A-2004-14159 | 1/2004 |

OTHER PUBLICATIONS

Gay et al., "Fuel Cell Hybrid Drive Train Configurations and Motor Drive Selection," *VTC 2002-Fall. 2002 IEEE 56th Vehicular Technology Conference Proceedings.*, Vancouver, Canada, Sep. 24-28, 2002, *IEEE Vehicular Technology Conference*, New York, NY: IEEE, US, vol. 1 of 4., Conf. 56, pp. 1007-1010 (Sep. 24, 2002).

* cited by examiner

*Primary Examiner*—Patrick Ryan
*Assistant Examiner*—Thomas H. Parsons
(74) *Attorney, Agent, or Firm*—Oliff & Berridge, PLC

(57) ABSTRACT

A fuel cell system FC replenishes a fuel cell stack with air or hydrogen by temporarily driving a compressor or a low-pressure valve even during an intermittent operation mode. If air is supplied for replenishment, the amount of air remaining in an air supply system is kept substantially constant, so that the voltage fall during a stop of the fuel cell system can be curbed. If hydrogen is supplied for replenishment, the amount of hydrogen moving to the air supply system is offset, so that a delay in supplying hydrogen can be curbed. Furthermore, the fuel cell system FC inputs signals from a sensor, such as, a brake sensor, a shift selector, or other suitable means and anticipates acceleration of a vehicle equipped with the system FC. On the basis of the anticipation of acceleration, the system FC replenishes the fuel cell stack with air or hydrogen in advance.

18 Claims, 8 Drawing Sheets

FUEL CELL SYSTEM, MOBILE UNIT EQUIPPED WITH THE SYSTEM, AND CONTROL METHOD FOR THE FUEL CELL SYSTEM

CROSS-REFERENCE TO RELATED APPLICATIONS

This application is the U.S. national stage of PCT/IB2003/005314, filed Nov. 21, 2003, which claims priority from Japanese Patent Application No. 2002-338675 filed Nov. 22, 2002, the disclosures of both of which are incorporated herein in their entireties by reference thereto.

The disclosure relates to a control of operation of a fuel cell that generates electric power through electrochemical reactions between hydrogen and oxygen.

BACKGROUND

Fuel cells that generate electric power through electrochemical reactions between hydrogen and oxygen are drawing attention as an energy source. A fuel cell has a construction in which an electrolyte is sandwiched between a hydrogen electrode and an oxygen electrode. When the hydrogen electrode is supplied with a hydrogen-rich fuel gas and the oxygen electrode is supplied with an oxidizing gas, such as air or the like, hydrogen and oxygen from these gases react to generate electric power.

Some fuel cell-equipped electric vehicles use a secondary battery in addition to a fuel cell, and perform a control of selectively using them in an appropriate fashion. For example, in a technology disclosed in Japanese Patent Application Laid-Open Publication No. 2001-307758, both a fuel cell and a secondary battery are used to supply power to an electric motor provided as a drive power source during a normal condition. During an operation state where the power generation efficiency of the fuel cell becomes low, a control of stopping the power generation of the fuel cell and driving the electric motor via only the secondary battery is performed.

However, in the above-described fuel cell system, a considerable amount of time is needed for supplying the oxidizing gas or the fuel gas, and activating the electrochemical reactions, and raising the voltage to a required level at the time of a change of control of power generation of the fuel cell from a stopped state to an operating state. Therefore, in some cases, a requested electric power cannot be smoothly output, but a delay occurs in electric power generation. Such a power generation delay sometimes causes degraded drivability in the case of a mobile unit, such as a motor vehicle or the like. Of course, this problem also concerns standstill-type fuel cell systems and the like.

SUMMARY

An object is to output a requested electric power at good timing when a fuel cell system starts to supply electricity.

A first aspect is a fuel cell system that generates electric power when supplied with hydrogen and oxygen. The fuel cell system includes: a fuel cell stack including a hydrogen electrode and an oxygen electrode that are disposed at opposite sides of an electrolyte; a hydrogen supplier portion that supplies hydrogen to the hydrogen electrode; an oxygen supplier portion that supplies oxygen to the oxygen electrode; an input portion that inputs a requested electric power; a generation control portion that causes the fuel cell stack to generate an electric power corresponding to the requested electric power by controlling the oxygen supplier portion and the hydrogen supplier portion; and a non-generation-time control portion that stops a generation control performed by the generation control portion if the requested electric power is lower than or equal to a predetermined value, and that operates at least one of the oxygen supplier portion and the hydrogen supplier portion based on a predetermined condition regardless of the requested electric power.

The oxygen supplier portion is a mechanism that supplies oxygen to the oxygen electrode, and the hydrogen supplier portion is a mechanism that supplies hydrogen to the hydrogen electrode. Both supplier portions include, for example, piping, pumps, valves, etc. The gas supplied to the oxygen electrode does not need to be pure oxygen, but may also be an oxidizing gas that contains oxygen, for example, air or the like. The gas supplied to the hydrogen electrode does not need to be pure hydrogen, but may also be a hydrogen-rich fuel gas. The aforementioned requested electric power may be zero, or may be a predetermined threshold value that is determined taking the generation efficiency of the fuel cell system into account.

In the above-described fuel cell system, operation of the oxygen supplier portion or the hydrogen supplier portion is caused on the basis of a predetermined condition even if the power generation performed by the fuel cell stack is stopped. The "operation" herein means a state where accessories, such as a compressor, a pump, a valve, etc., are left in operation in order to supply a fuel gas or oxidizing gas although power generation is not performed. Due to this construction, the oxygen shortage on the oxygen electrode side can be resolved if the oxygen supplier portion is operated. Operation of the hydrogen supplier portion resolves the hydrogen shortage on the hydrogen electrode side associated with permeation of hydrogen through the electrolyte to the oxygen electrode side. Therefore, the fuel cell system is able to curb a power generation delay attributed to an insufficient amount of oxygen or hydrogen remaining at the time of activation or re-activation of the fuel cell system. Furthermore, if oxygen is supplied, the hydrogen that has permeated to the oxygen electrode side can be discharged out.

In the above-described fuel cell system, the non-generation-time control portion may operate at least one of the oxygen supplier portion and the hydrogen supplier portion at a preset timing. The preset timing may be a periodic timing, or may also be an irregular timing. Therefore, it becomes possible to reduce the power generation delay associated with oxygen shortage or hydrogen shortage even if the fuel cell system has been stopped for a relatively long time.

The above-described fuel cell system may further include a hydrogen pressure detection portion that detects a pressure of hydrogen supplied to the hydrogen electrode, and the predetermined condition may be that the pressure of hydrogen is lower than or equal to a predetermined value. As mentioned above, the permeation of hydrogen through the electrolyte from the hydrogen electrode side to the oxygen electrode side occurs during a stop of the fuel cell system or the like. However, in the above-described construction, the reduction in the amount of hydrogen can be substantially offset by operating the hydrogen supplier portion. Therefore, the hydrogen shortage at the time of activation or re-activation of the fuel cell system can be lessened. If in this case, the oxygen supplier portion is operated, the hydrogen that has permeated to the oxygen electrode side will be discharged out. The aforementioned predetermined value is a pressure of hydrogen that is needed in order to prevent a power generation delay.

The fuel cell system may further include a voltage measurement portion that measures a voltage between a positive electrode and a negative electrode of the fuel cell stack, and the predetermined condition may be that the voltage is lower than or equal to a predetermined value.

Therefore, a reduction in the amount of oxygen or hydrogen can be detected if the inter-terminal voltage of the fuel cell stack becomes low. Hence, this construction also makes it possible to offset the reduction in the amount of oxygen or hydrogen and therefore eliminate the power generation delay. The aforementioned predetermined value is a voltage that is needed in order to prevent the power generation delay.

The fuel cell system may further include a power increase anticipation portion that anticipates an increase in the requested electric power; and the predetermined condition may be that an increase in the requested electric power is anticipated.

Therefore, it becomes possible to curb the power generation delay of the fuel cell system by supplying oxygen or hydrogen for replenishment in advance. The case where an increase in the requested electric power is anticipated is, for example, a case where the time is reaching a predetermined activation time point at which the fuel cell system is preset so as to activate, or a case where acceleration of a mobile unit, such as a vehicle or the like, is anticipated provided that the mobile unit is equipped with the fuel cell system.

A second aspect is a mobile unit capable of moving by an electric motor that is driven by a fuel cell system as an energy source. The fuel cell system includes: a fuel cell stack including a hydrogen electrode and an oxygen electrode that are disposed at opposite sides of an electrolyte; a hydrogen supplier portion that supplies hydrogen to the hydrogen electrode; an oxygen supplier portion that supplies oxygen to the oxygen electrode; an input portion that inputs a requested electric power to drive the motor; and a generation control portion that causes the fuel cell stack to generate an electric power corresponding to the requested electric power by controlling the oxygen supplier portion and the hydrogen supplier portion. The mobile unit includes: a power increase anticipation portion that anticipates an increase in the requested electric power; and a non-generation-time control portion that stops a generation control performed by the generation control portion if the requested electric power is lower than or equal to a predetermined value, and that operates at least one of the oxygen supplier portion and the hydrogen supplier portion regardless of the requested electric power if the increase is anticipated.

Examples of the case where an increase in the requested electric power is anticipated include a case where acceleration of the mobile unit is anticipated, or the like. In such a case, it is expected that electric power will soon be needed. According to the mobile unit of the disclosure, oxygen or hydrogen can be supplied for replenishment prior to activation of the fuel cell system. Therefore, it becomes possible to reduce the power generation delay and improve drivability. The mobile unit herein refers to a motor vehicle, a ship, a boat, an aircraft, etc. which moves using a fuel cell system as an electric power source.

In the above-described mobile unit, the power increase anticipation portion may anticipate the increase based on at least one of an operation of an operating portion related to acceleration or deceleration of the mobile unit, a prediction related to a route of the mobile unit, and an acceleration that acts on the mobile unit in a direction transverse to a traveling direction of the mobile unit.

Examples of the "operation of an operating portion related to acceleration or deceleration" include a reduction in the amount of depression of a foot brake, or release thereof, release of a parking brake, a change of a shift selector (a parking-to-drive change, a parking-to-reverse change, etc.), etc. If a driver performs such an operation, it is often the case that the driver will next depress the accelerator pedal for acceleration. Thus, an increase in the requested electric power can be anticipated.

The "prediction related to a route of the mobile unit" may be, for example, a case where the route information provided by the navigation system indicates that there is an uphill slope in the traveling direction, or that the mobile unit is entering a speedway, or that the number of lanes will increase, or that the speed limit will be increased. In such cases, drivers are likely to depress the accelerator pedal. Thus, an increase in the requested electric power can be anticipated.

If an acceleration acting on the mobile unit in a direction transverse to the traveling direction of the mobile unit is detected, it can be judged that the mobile unit is running along a curve. Since the mobile unit is often accelerated after running through a curve, detection of a transverse acceleration permits anticipation of an increase in the requested electric power.

The aforementioned various features are applicable in appropriate combinations, or with omission of one or more of the features. The disclosure also provides a control method for a fuel cell system as still another aspect in addition to the fuel cell system and the mobile unit. In any one of the aspects, the aforementioned features are applicable in any suitable manner.

BRIEF DESCRIPTION OF THE DRAWINGS

The foregoing and further objects, features and advantages of the disclosure will become apparent from the following description of preferred embodiments with reference to the accompanying drawings, wherein like numerals are used to represent like elements and wherein.

DETAILED DESCRIPTION OF EMBODIMENTS

Preferred embodiments of the disclosure will be described hereinafter with reference to the accompanying drawings, in the following order:

A. OVERALL CONSTRUCTION OF FUEL CELL SYSTEM;
B. SWITCHING OF OPERATION MODE;
C. AIR REPLENISHMENT;
D. HYDROGEN REPLENISHMENT;
E. HYDROGEN DISCHARGE; and
F. ANTICIPATION-BASED ACTIVATION.

A. Overall Construction of Fuel System

Figure 1:
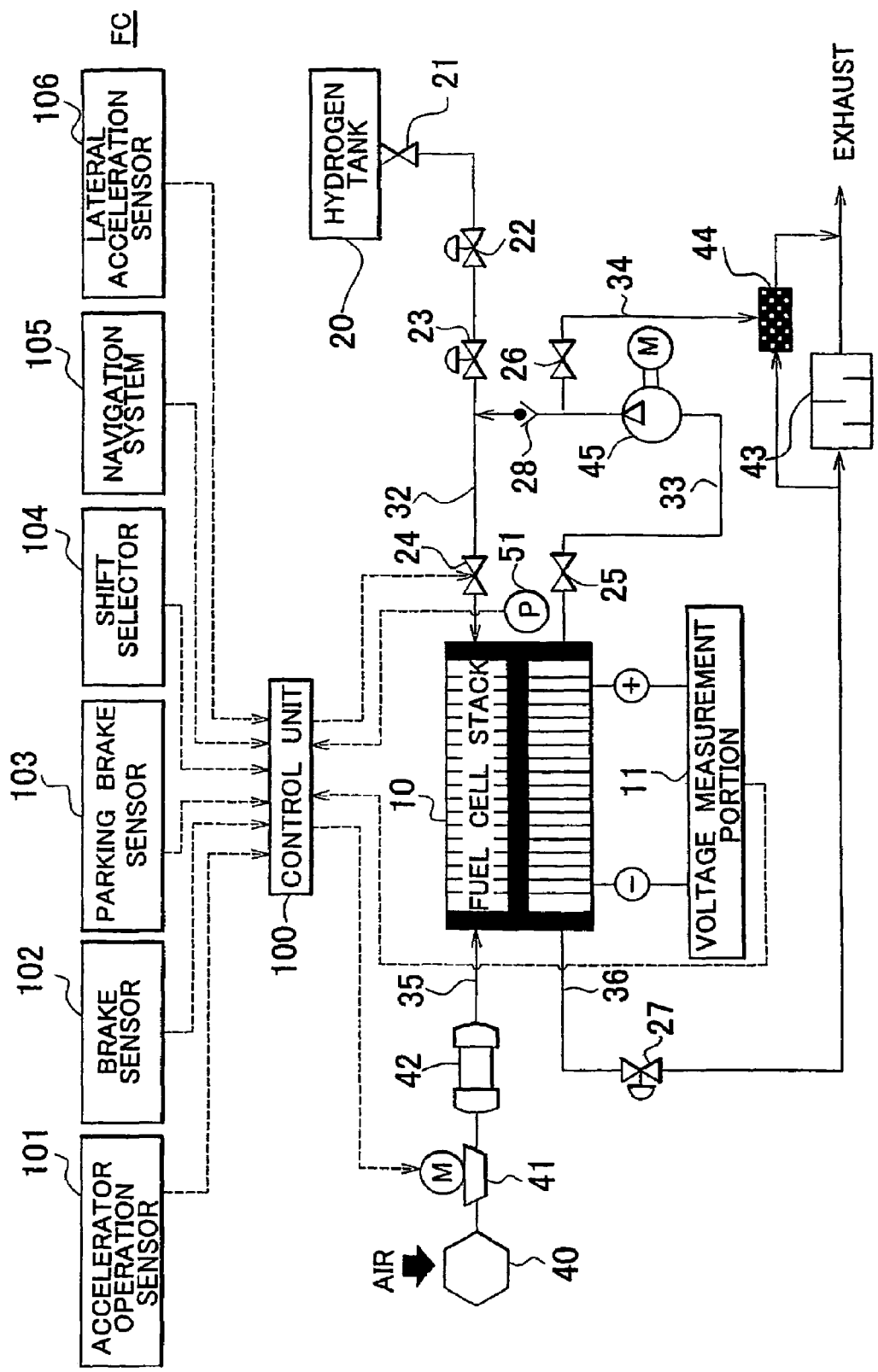
FIG. 1 is a diagram illustrating an overall construction of a fuel cell system.

FIG. 1 is a diagram illustrating an overall construction of a fuel cell system FC as an exemplary embodiment. The fuel cell system FC of the embodiment is installed as an electric power source in an electric vehicle that is driven by an electric motor. The electric vehicle is equipped with a secondary battery as another power source in addition to the fuel cell system FC. When a driver operates an accelerator, the fuel cell system FC is caused to generate power in accordance with the amount of operation of the accelerator detected by an accelerator operation sensor 101, so that the vehicle runs by the generated electric power. If the power generation efficiency of the fuel cell system FC is low, the electric motor can be driven by the secondary battery as well. Although in the embodiment, the fuel cell system FC is installed in a vehicle, it is also possible to adopt various other constructions, such as a standstill-type construction and the like.

A fuel cell stack 10 is formed by stacking cells that generate electric power through electrochemical reactions between hydrogen and oxygen. Each cell has a construction in which an electrolyte membrane is disposed between a hydrogen electrode (hereinafter, referred to as "anode") and an oxygen electrode (hereinafter, referred to as "cathode"). Although this embodiment adopts solid polymer type cells that incorporate, as an electrolyte membrane, solid polymer membranes formed by Nafion (registered) or the like, it is also possible to employ various other types of cells. A voltage measurement portion 11 for measuring voltage is provided between the positive and negative electrodes of the fuel cell stack 10.

Each cathode of the fuel cell stack 10 is supplied with a compressed air as an oxygen-containing gas. Air is drawn in via a filter 40. After being compressed by a compressor 41, the air is humidified by a humidifier 42, and then is supplied to the fuel cell stack 10 via a piping 35. Exhaust gas from each cathode (hereinafter, referred to as "cathode-off gas") is discharged from the fuel cell system FC via a piping 36 and a muffler 43. The pressure of air discharged is controlled by the degree of opening of a pressure regulating valve 27.

Each anode of the fuel cell stack 10 is supplied with hydrogen from a hydrogen tank 20 storing high-pressure hydrogen, via a piping 32. Hydrogen may also be supplied to the anodes by producing hydrogen through reforming reactions of a raw material, such as alcohol, hydrocarbon, aldehyde, etc., instead of using the hydrogen tank 20.

The hydrogen stored at high pressure in the hydrogen tank 20 is adjusted in pressure and amount by a shut valve 21 provided at an outlet of the hydrogen tank 20, a regulator 22, a high-pressure valve 23, and a low-pressure valve 24 before being supplied to the anodes. Exhaust gas from the anodes (hereinafter, referred to as "anode-off gas") flows out into a piping 33. An outlet from the anodes is provided with a pressure sensor 51 and a valve 25 that are used to control the pressure and amount of hydrogen supplied to the anodes.

The piping 33 branches at an intermediate point into two lines: one connected to a discharge pipe 34 for discharging the anode-off gas out, and the other one connected to the piping 32 via a check valve 28. As a result of consumption of hydrogen due to power generation of the fuel cell stack 10, the anode-off gas has a relatively low pressure. Therefore, the piping 33 is provided with a pump 45 for pressurizing the anode-off gas.

During a closed state of a discharge valve 26 provided on the discharge pipe 34, the anode-off gas is circulated through the fuel cell stack 10 via the piping 32. The circulation of the anode-off gas allows effective use of hydrogen since the anode-off gas contains residual hydrogen that has not been consumed for power generation.

During the circulation of the anode-off gas, hydrogen is consumed for power generation whereas impurities, that is, components other than hydrogen, are not consumed but remain in the anode-off gas, so that the concentration of impurities gradually increases. The impurities in the anode-off gas include, for example, nitrogen that passes through the electrolyte membranes from the cathodes. If the discharge valve 26 is opened during this state, the anode-off gas passes through the discharge pipe 34, and is diluted by air in a diluter 44, and then is discharged from the fuel cell system FC, so that the amount of impurities circulated reduces.

The operation of the fuel cell system FC is controlled by a control unit 100. The control unit 100 is formed as a microcomputer that contains a CPU, a RAM, a ROM, etc. The control unit 100 controls the operation of the system in accordance with programs stored in the ROM.

The programs cause the CPU to accomplish a function of controlling the compressor 41 and the low-pressure valve 24 so as to cause the fuel cell stack 10 to generate an electric power corresponding to a requested power, and a function of stopping the power generation of the fuel cell stack if the requested power is not greater than a predetermined value, and of operating the compressor 41 and the low-pressure valve 24 on the basis of a predetermined condition.

Although in the embodiment, the control unit 100 controls the compressor 41 and the low-pressure valve 24, it is also possible to control the pressure regulating valve 27 instead of the compressor 41, and control the high-pressure valve 23 or the regulator 22 instead of the low-pressure valve 24. That is, it is appropriate that a mechanism capable of adjusting the amounts of supply of oxygen and hydrogen can be controlled.

In FIG. 1, broken lines indicate examples of the signals input to and output from the control unit 100 in order to accomplish the above-described control. Examples of the input signals include detection signals from the voltage measurement portion 11, the pressure sensor 51, the accelerator operation sensor 101, a brake sensor 102, a parking brake sensor 103, a shift selector 104, a navigation system 105, a lateral acceleration sensor 106, etc. Examples of the output signals include the signals to the compressor 41, the low-pressure valve 24, etc.

B. Switching of Operation Mode

Figure 2:
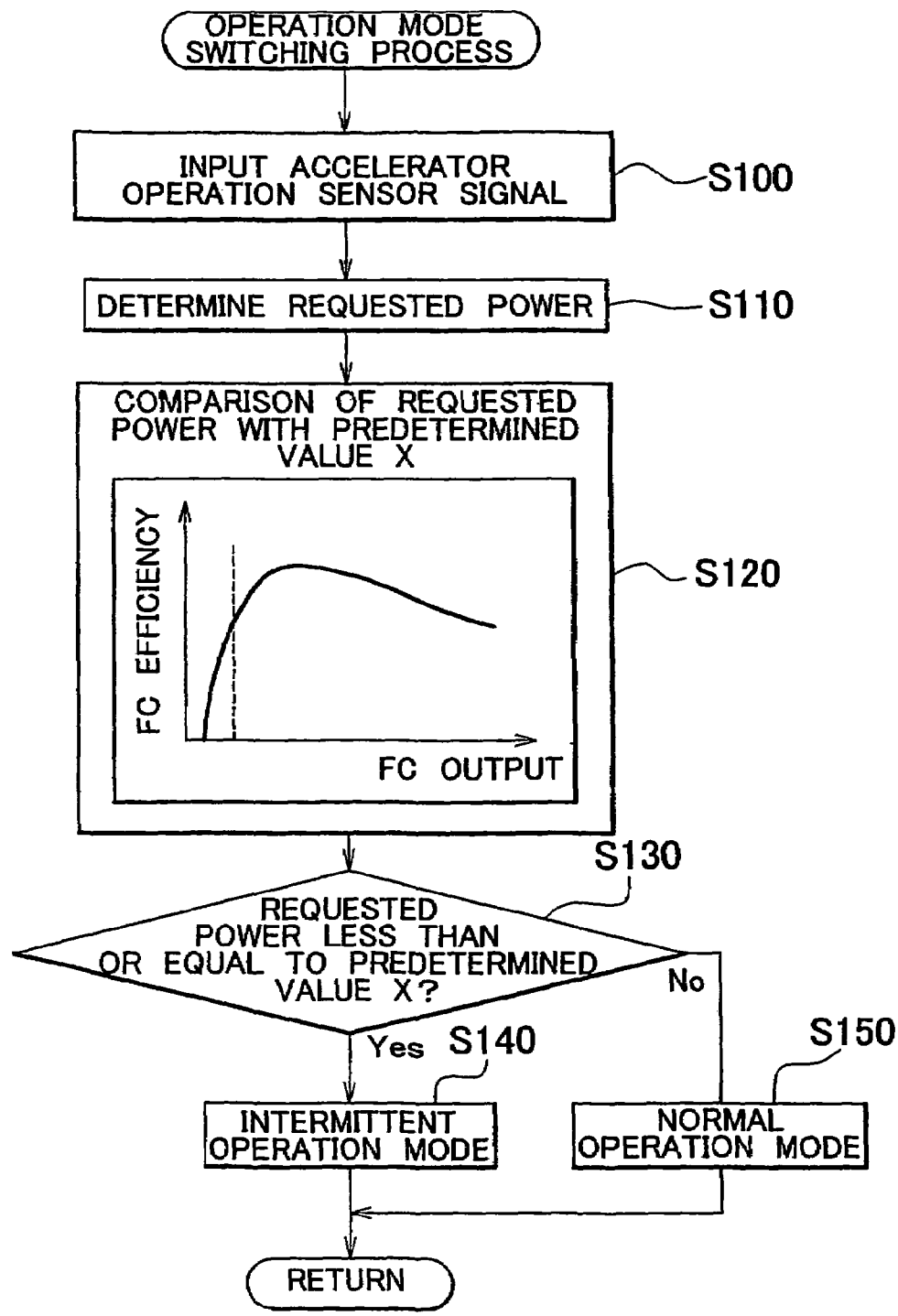
FIG. 2 is a flowchart illustrating an operation mode switching process.

FIG. 2 is a flowchart illustrating a process of switching the operation mode of an electric vehicle equipped with the above-described fuel cell system FC. The process of switching the operation mode is a process of selecting a mode in which the electric motor is driven by using power generated by the fuel cell system FC or a mode in which the electric motor is driven only by the power supplied from the secondary battery.

The control unit 100 inputs the amount of accelerator operation provided by a driver via the accelerator operation sensor 101 (step S100), and determines the power needed for driving the electric motor in accordance with the amount of accelerator operation. The needed power can be determined from a predetermined map, an arithmetic expression, etc. The thus-determined electric power is a power requested by the driver in order to drive the electric vehicle.

Subsequently, the control unit 100 compares the requested power determined in step S110 with a predetermined value X (step S120). The predetermined value X is a threshold value that indicates a region where the generation efficiency of the fuel cell system FC deteriorates. The deterioration of generation efficiency is a phenomenon that occurs when a major portion of the electric power generated is consumed to drive accessories, such as the compressor 41, the pump 45, etc.

If the comparison determines that the requested power is less than or equal to the predetermined value X (YES at step S130), an intermittent operation mode is set as an operation mode (step S140). The intermittent operation mode is a mode in which the fuel cell system FC is stopped and the electric motor is driven only by the secondary battery. The stopping of the fuel cell system FC herein means the stopping of the compressor 41 and the closing of the low-pressure valve 24. Conversely, if it is determined that the requested power is greater than the predetermined value X (NO at step S130), a normal operation mode is set as an operation mode (step S150). The normal operation mode is a mode in which the electric motor is driven by using the fuel cell system FC. During the normal operation mode, the secondary battery may also be used as well. The control unit 100 normally cyclically executes the operation mode switching process if a main power switch of the electric vehicle is on.

By appropriately switching the operation mode as described above, the electric vehicle of the embodiment is able to use the fuel cell system FC only when the generation efficiency of the system FC is good. Therefore, the use of hydrogen can be economized.

Various operation controls performed during the intermittent operation mode of the fuel cell system FC will be described below.

C. Air Replenishment

Figure 3:
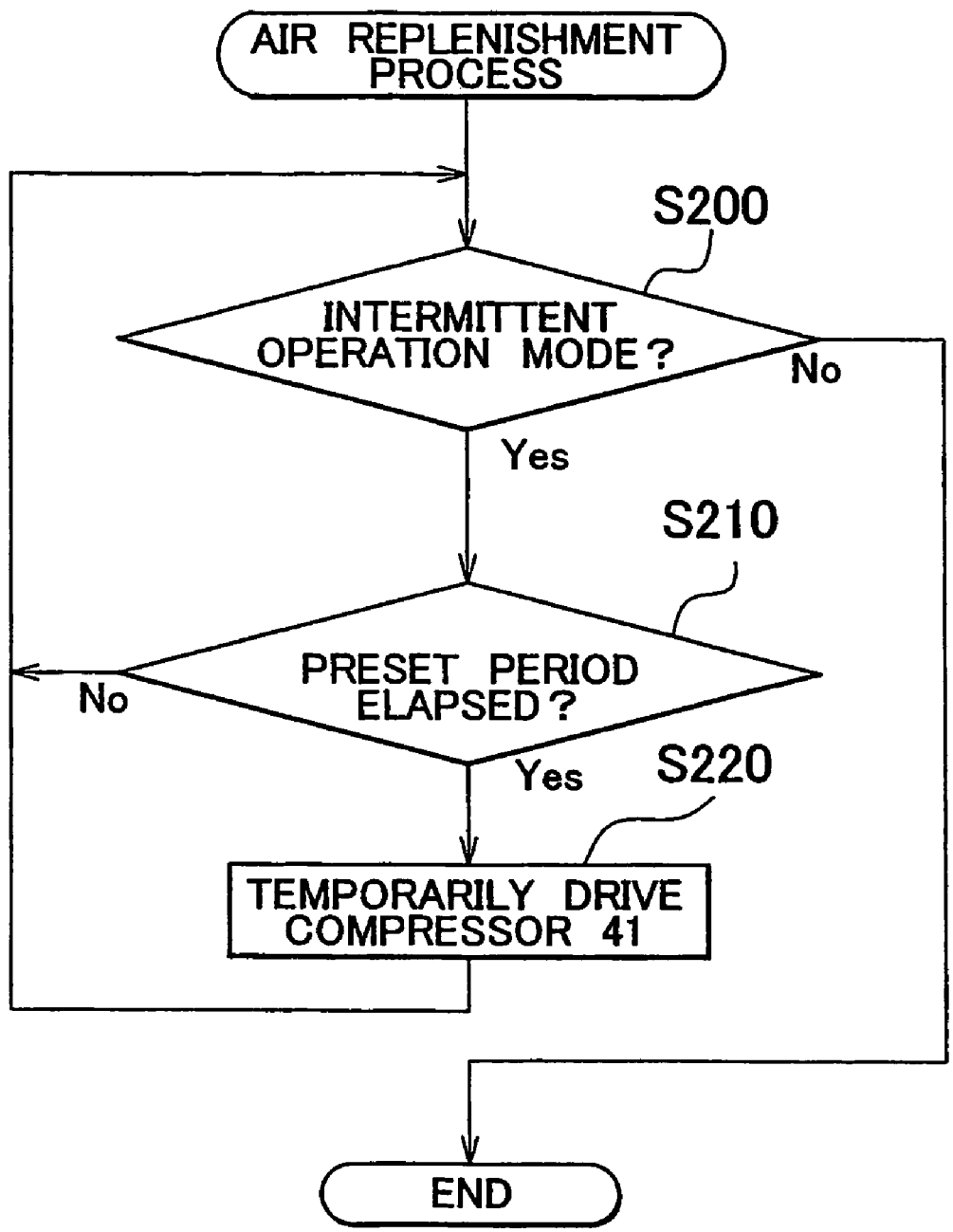
FIG. 3 is a flowchart illustrating an air replenishment process.

FIG. 3 is a flowchart illustrating an air replenishment process executed by the control unit 100. In the fuel cell system FC, migration of a portion of the hydrogen through an electrolyte membrane from the anode side to the cathode side results in a chemical reaction on the cathode side so that oxygen present in the piping 35 is consumed. Since oxygen exists in air only in an amount of about 20 percents, oxygen runs short before hydrogen. Therefore, in this process, the reduction in the amount of oxygen is offset by a supply of oxygen provided by appropriately operating the compressor 41, which is normally stopped during the intermittent operation mode.

The control unit 100 first determines whether the present operation mode is the intermittent operation mode (step S200). If the present mode is the intermittent operation mode (YES at step S200), the control unit 100 then determines whether a pre-set period has elapsed (step S210). The predetermined period may be, for example, a time length of 10 seconds, 20 seconds, etc. If the predetermined period has elapsed (YES at step S210), the compressor 41 is driven temporarily, for example, for 2 seconds, to supply air (step S220). The elapse of the predetermined period is detected by provision of a timer, a counter, etc. After the compressor 41 is driven in S220, or if it is determined in step S210 that the predetermined period has not elapsed, the control unit 100 returns to step S200, and executes the above-described process as a loop. If the operation mode is switched from the intermittent operation mode to the normal operation mode (NO at step S200), the execution of the process ends. Due to the above-described process, the control unit 100 is able to regularly replenish the cathodes with air during the intermittent operation mode of the fuel cell system FC.

Figure 4:
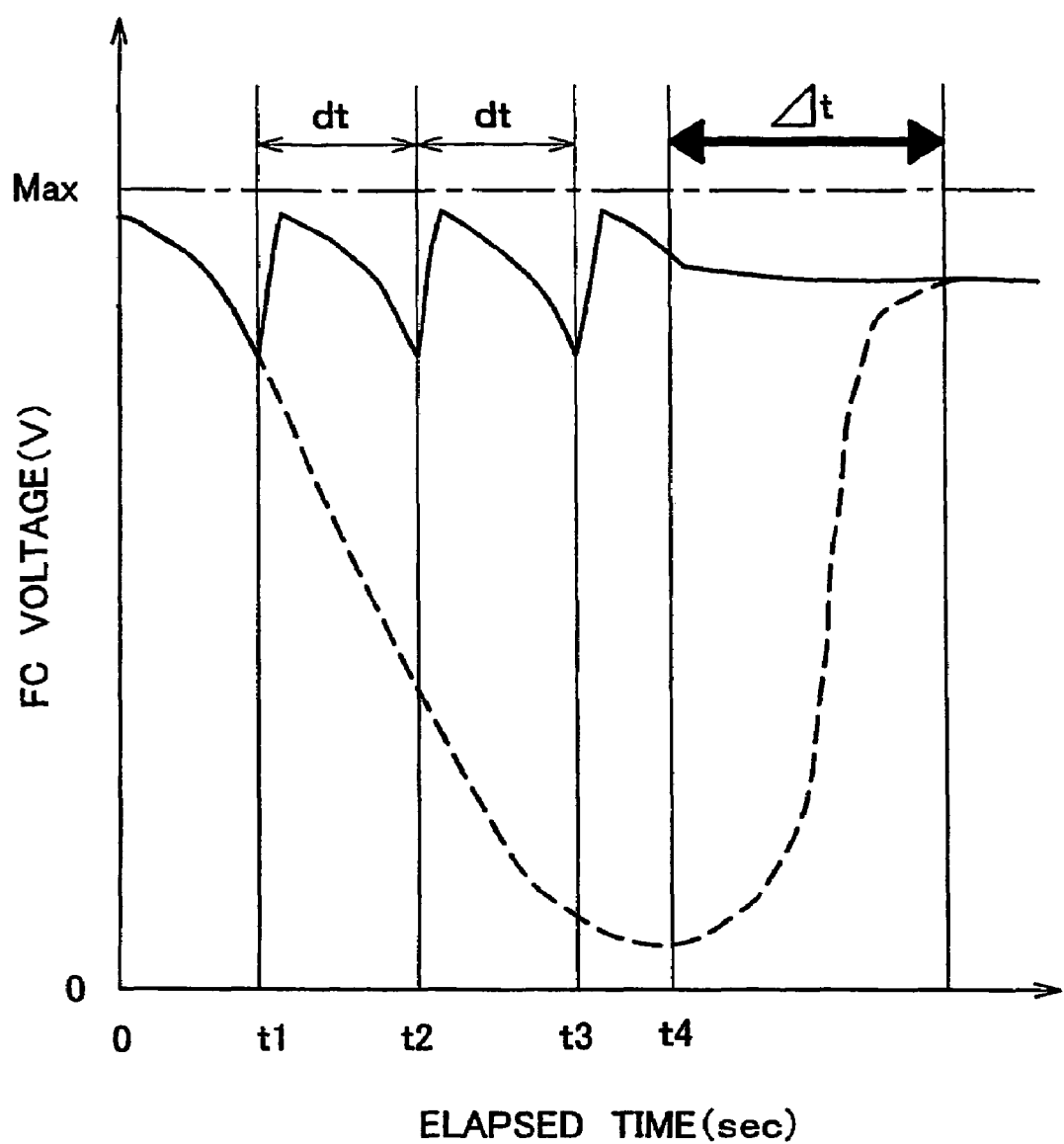
FIG. 4 is a diagram indicating effects of the air replenishment process.

FIG. 4 is a diagram indicating the effects achieved by the above-described process. In FIG. 4, the horizontal axis indicates the elapsed time following the setting of the intermittent operation mode, and the vertical axis indicates the voltage between the positive and negative electrodes of the fuel cell stack 10. A broken-line curve indicates changes in the voltage with elapse of time in a case where the air replenishment process is not executed, and a solid line indicates changes in the voltage in a case where the air replenishment process is executed. In the case indicated by the solid line, the compressor 41 is operated at time points t1, t2, t3 with intervals of a period dt, and the intermittent operation mode is changed to the normal operation mode at a time point t4.

As indicated by the broken line, the electric potential decreases with elapse of time if the air replenishment process is not executed. The reason for the electric potential drop is that oxygen runs short on the cathode side due to the aforementioned permeation of hydrogen through the electrolyte membrane. Therefore, the switching to the normal operation mode at timing t4 is followed by a power generation delay $\Delta t$ before the output of the fuel cell stack 10 rises to a requested power. However, periodical execution of the air replenishment process as indicated by the solid line curbs the voltage fall, and substantially eliminates the power generation delay.

Although the chemical reaction resulting from the permeation of hydrogen produces water on the cathode side, the produced water can be discharged from the fuel cell system FC by appropriately driving the compressor 41. Therefore, the air replenishment process also prevents the clogging of piping with water, and the like.

In the above-described process, the compressor is driven in accordance with the predetermined timing in step S210. However, the compressor may also be driven, for example, on the basis of a voltage fall detected directly by the voltage measurement portion 11.

D. Hydrogen Replenishment

Figure 5:
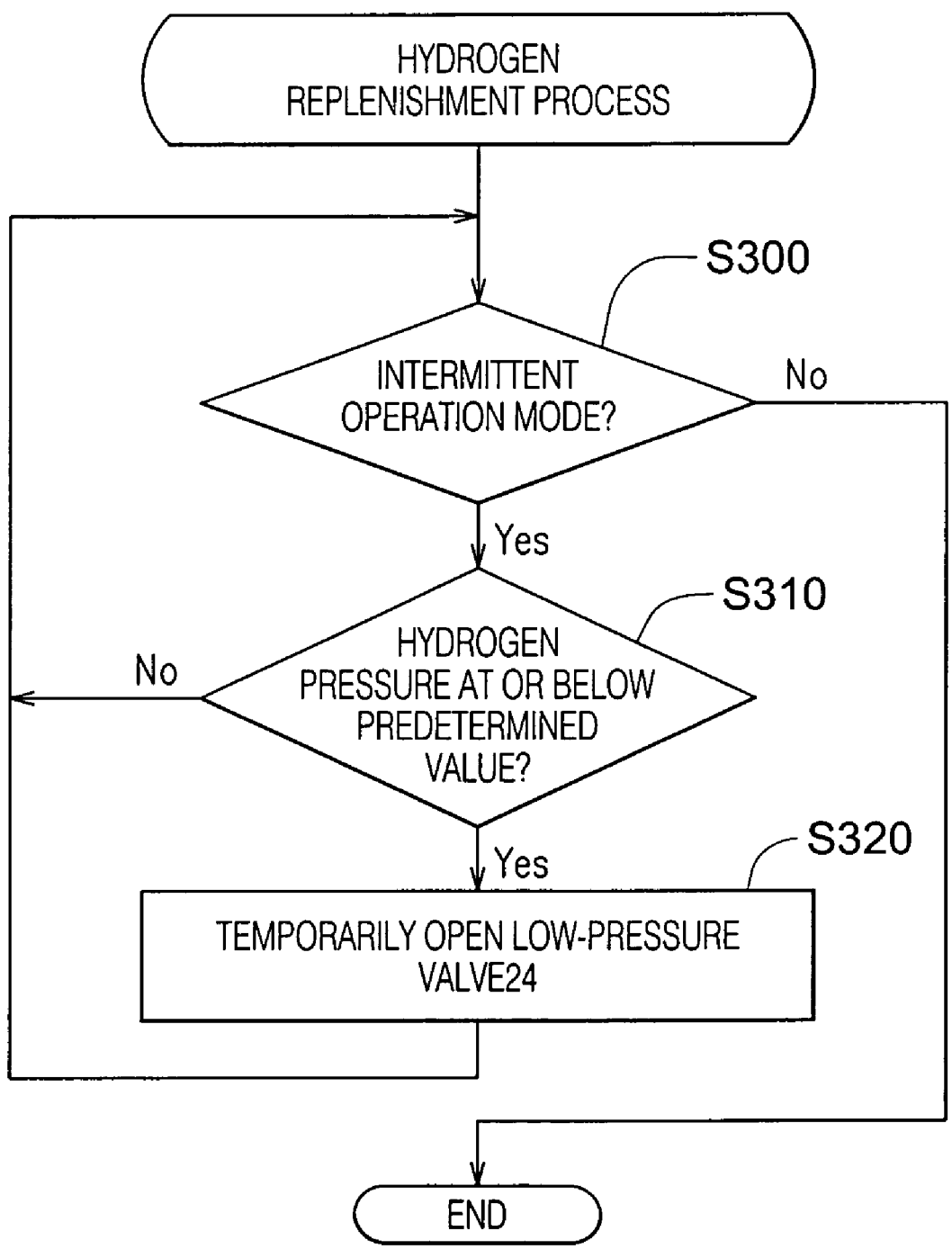
FIG. 5 is a flowchart illustrating a hydrogen replenishment process.

FIG. 5 is a flowchart illustrating a hydrogen replenishment process executed by the control unit 100. In the hydrogen replenishment process, hydrogen is supplied during the intermittent operation mode in order to resolve the problem of hydrogen shortage on the anode side caused by the aforementioned permeation of hydrogen although hydrogen is normally not supplied during the intermittent operation mode.

The control unit 100 first determines whether the present operation mode is the intermittent operation mode (step S300). If the present operation mode is the intermittent operation mode (YES at step S300), the control unit 100 then determines whether the hydrogen pressure is lower than or equal to a predetermined value (step S310). As a basis for this determination, the signal input from the pressure sensor 51 is used. If the hydrogen pressure is lower than or equal to the predetermined value (YES at step S310), the control unit 100 temporarily opens the low-pressure valve 24 to replenish the anode side with hydrogen (step S320). After hydrogen is supplied in step S320, or if it is determined in step S310 that the hydrogen pressure is higher than the predetermined value (NO at step S310), the control unit 100 returns to step S300, and executes the above-described process as a loop. If the operation mode is switched from the intermittent operation mode to the normal operation mode (NO at step S300), the execution of the process ends.

Figure 6:
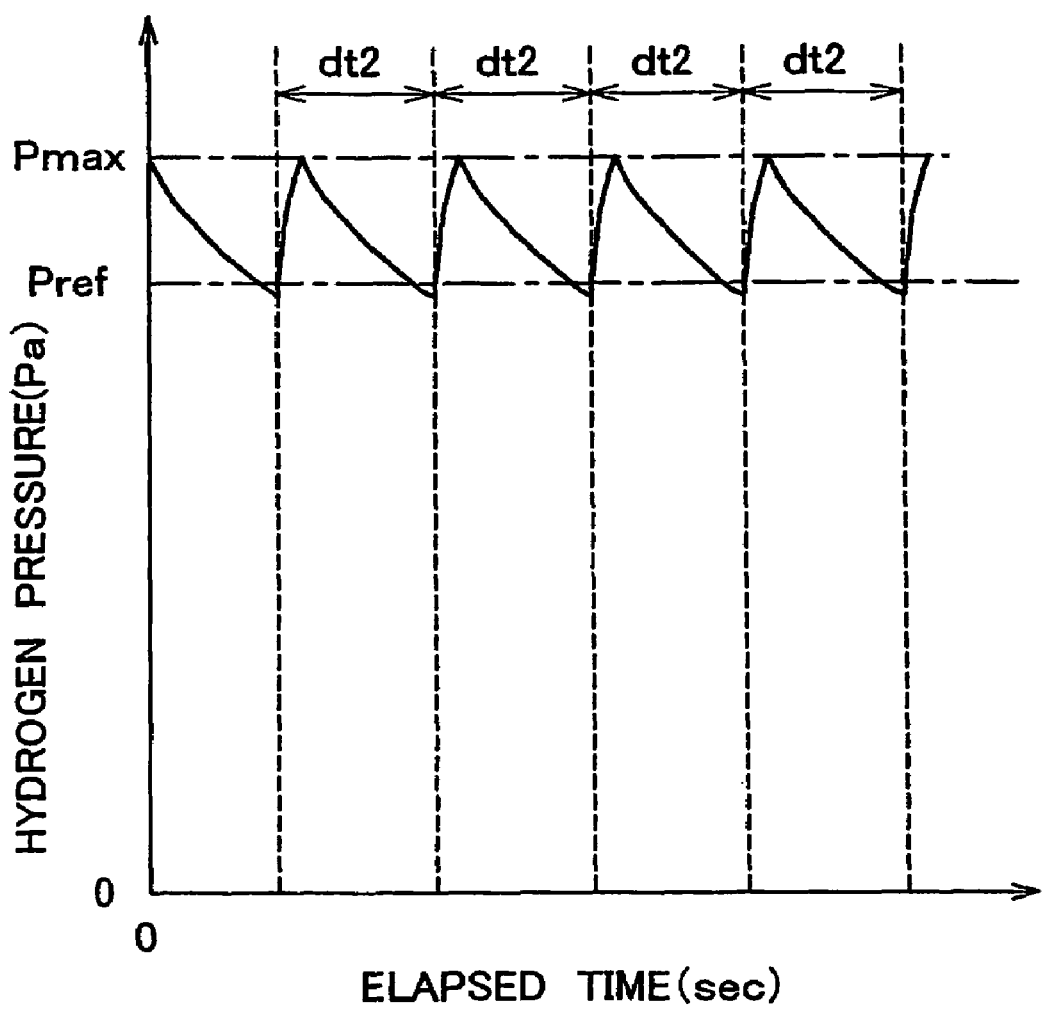
FIG. 6 is a diagram indicating effects of the hydrogen replenishment process.

FIG. 6 is a diagram indicating the effects achieved by the hydrogen replenishment process. In FIG. 6, the horizontal axis indicates the elapsed time following the setting of the intermittent operation mode, and the vertical axis indicates the hydrogen pressure. FIG. 6 indicates a case where the hydrogen replenishment is performed when the hydrogen pressure decreases to or below a reference pressure Pref (pascal). Since this process keeps the hydrogen pressure on the anode side at or above a certain level as indicated in FIG. 6, the process reduces the time that is needed for supplying hydrogen at the time of switching to the normal operation mode. Therefore, the hydrogen replenishment process allows smooth activation of the fuel cell system FC.

Although the determination in step S310 is based on the hydrogen pressure, detection of the elapse of a predetermined period (dt2 in FIG. 6) may be adopted as a basis for determining whether to supply hydrogen. This period may be set by, for example, measuring the time for a certain fall in the hydrogen pressure beforehand, and storing the measured time in the ROM of the control unit 100. It is also possible to measure the voltage via the voltage measurement portion 11, and to supply hydrogen when the voltage decreases to or below a predetermined voltage. This construction is possible because the electric potential decreases as the hydrogen pressure decreases. Hydrogen is supplied to the anode at the same timing, e.g., every 10 seconds, as the timing air is supplied to the cathode in the air replenishment process. Also, hydrogen is supplied to the anode at a timing that is different from the timing air is supplied to the cathode in the air replenishment process.

E. Hydrogen Discharge

Figure 7:
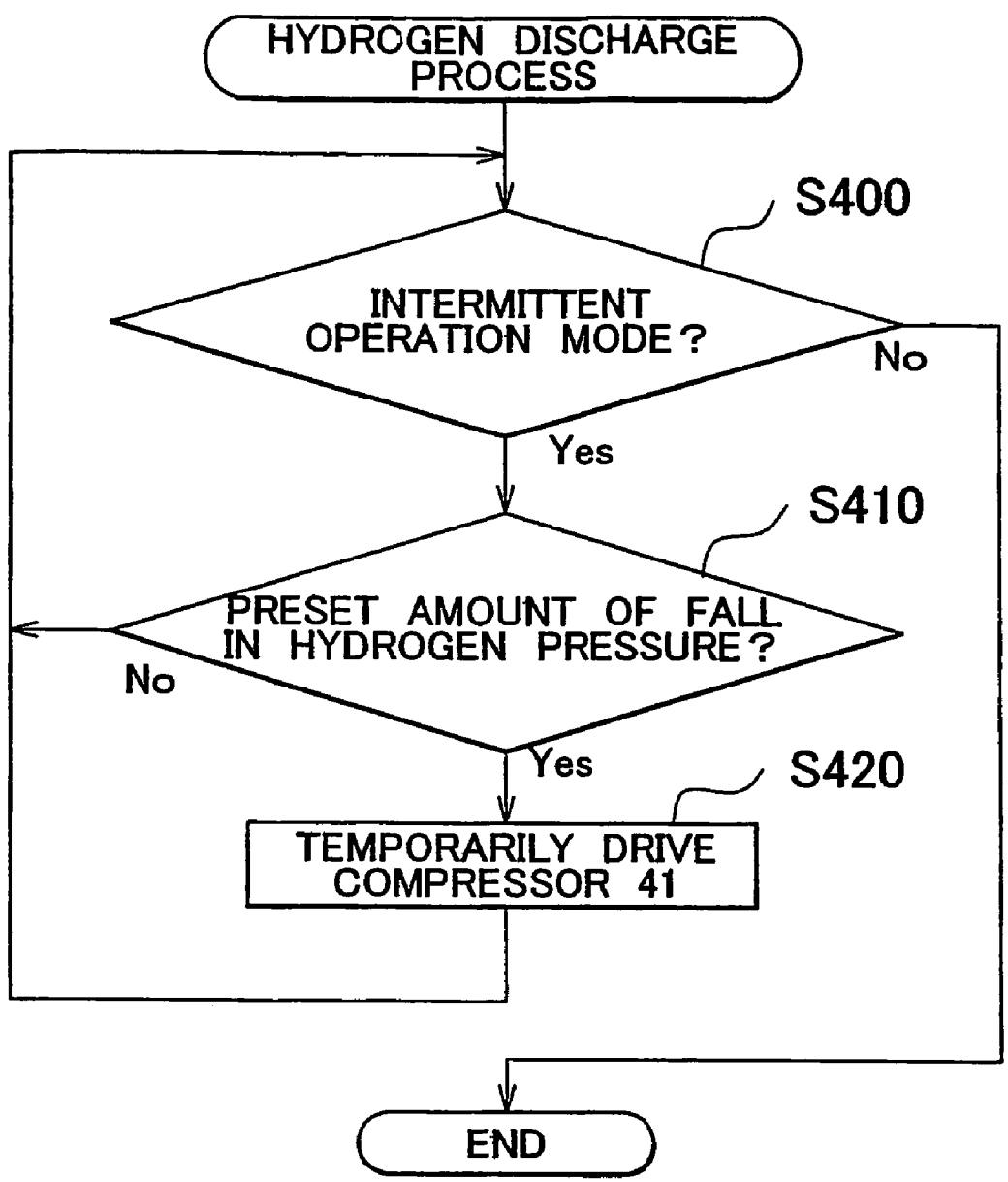
FIG. 7 is a flowchart illustrating a hydrogen discharge process.

FIG. 7 is a flowchart illustrating a hydrogen discharge process executed by the control unit 100. In this process, the compressor 41 is temporarily operated during the intermittent operation mode in order to discharge hydrogen that has moved to the cathode side due to the aforementioned permeation through the electrolyte membranes, although the compressor 41 is normally stopped during the intermittent operation mode.

The control unit 100 first determines whether the present operation mode is the intermittent operation mode (step S400). If the present operation mode is the intermittent operation mode (YES at step S400), the control unit 100 then determines whether the hydrogen pressure has decreased by a predetermined amount from the hydrogen pressure level occurring at the time of setting the intermittent operation mode (step S410). As a basis for this determination, the signal input from the pressure sensor 51 is used. If it is determined that the hydrogen pressure has decreased by the predetermined amount (YES at step S410), the control unit 100 temporarily operates the compressor 41 (step S420). After the compressor 41 is operated in step S420, or if it is determined in step S410 that the hydrogen pressure has not decreased by the predetermined amount (NO at step S410), the control unit 100 returns to step S400, and executes the above-described process as a loop. If the operation mode is switched from the intermittent operation mode to the normal operation mode (NO at step S400), the execution of the process ends.

According to this process, it can be judged that hydrogen has permeated to the cathode side if there is a fall in the hydrogen pressure. Therefore, the hydrogen can be appropriately discharged out through the use of the compressor 41. This process substantially prevents residence of hydrogen on the cathode side, and therefore prevents discharge of high-concentration hydrogen at the time of change to the normal operation mode. Furthermore, since the discharge of hydrogen involves supply of air, the hydrogen discharge process achieves substantially the same advantages as the air replenishment process.

F. Anticipation-Based Activation

Figure 8:
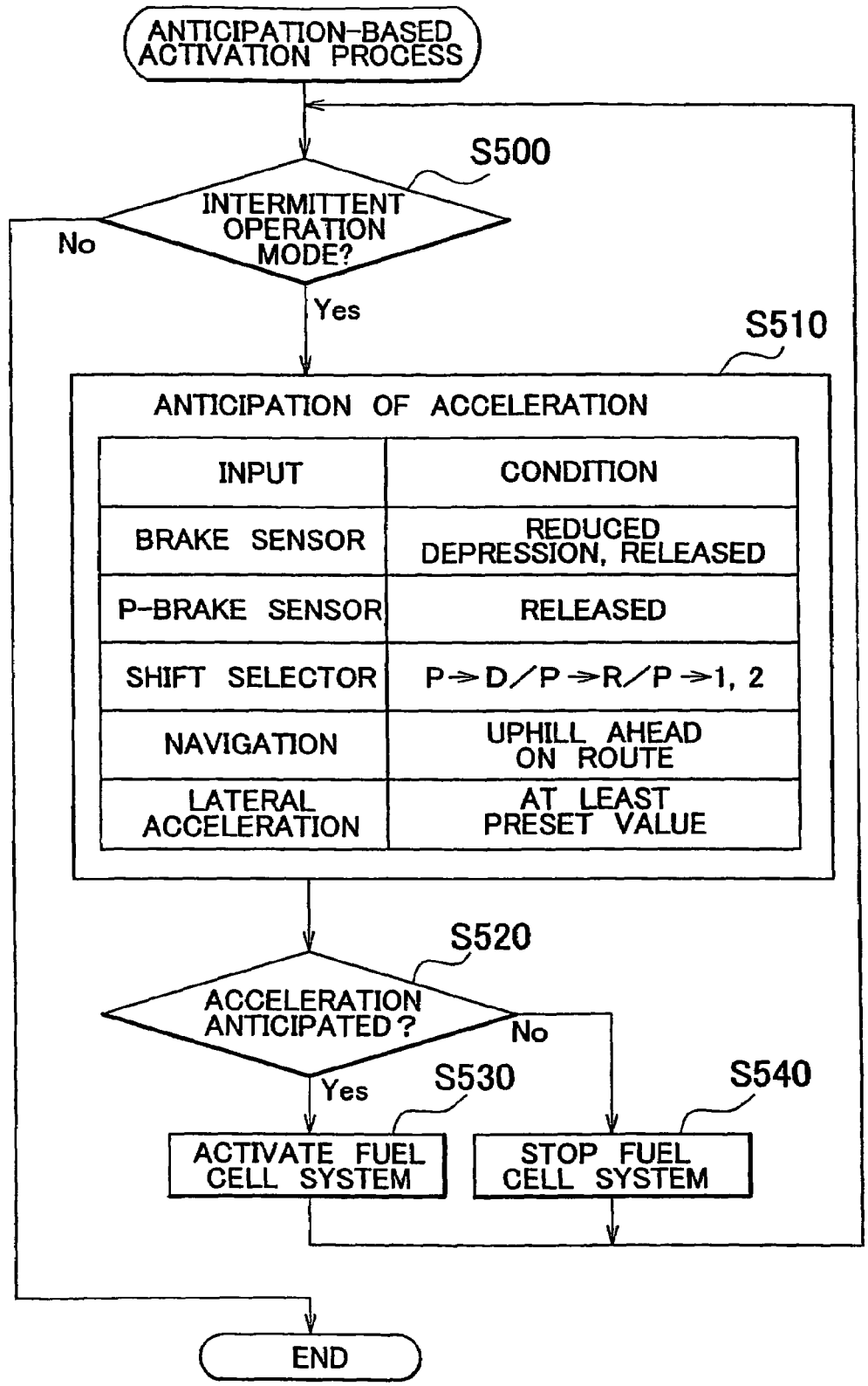
FIG. 8 is a flowchart illustrating an anticipation-based activation process.

FIG. 8 is an anticipation-based activation process executed by the control unit 100. This process is executed to smoothly switch the operation mode from the intermittent operation mode to the normal operation mode when it is anticipated that depression of the accelerator is performed during the intermittent operation mode.

The control unit 100 first determines whether the present operation mode is the intermittent operation mode (step S500). If the present operation mode is the intermittent operation mode, the control unit 100 executes a process for anticipating acceleration (step S510). The acceleration anticipating process is executed in order to anticipate whether the accelerator pedal will be depressed. The accelerator pedal is depressed, for example, when the vehicle is to accelerated. As shown in a table in FIG. 8, depression of the accelerator pedal may be expected generally in the following cases.

(1) The case where a reduction in the amount of depression of the brake pedal or release of the brake pedal is detected by the brake sensor 102.

(2) The case where release of the parking brake is detected by the parking brake sensor 103.

(3) The case where the shift selector 104 detects a shift from the parking (P) to the drive (D), a shift from the parking (P) to the reverse (R), or a shift from the parking to the first speed or the second speed.

(4) The case where the navigation system 105 indicates an uphill slope or a speedway located ahead on the route.

(5) The case where acceleration in the transverse direction relative to the vehicle is detected by the lateral acceleration sensor 106. In the case (5), it can be considered that the vehicle is running along a curve, and it is often the case that the vehicle is accelerated after running through a curve.

If depression of the accelerator pedal is anticipated by the above-described method (YES at step S520), an increase in the requested power can be anticipated, and therefore the control unit 100 activates the fuel cell system FC (step S530). If acceleration is not anticipated, the control unit 100 maintains the stopped state (step S540). The "activation of the fuel cell system FC" herein means that the intermittent operation mode is maintained and the fuel cell stack is supplied with oxygen and hydrogen, so that the requested power can be output immediately. The control unit 100 regularly cyclically executes the above-described processes during the intermittent operation mode.

Due to the above-described process, it is possible to output a requested power at good timing even when the operation mode is switched from the intermittent operation mode to the normal operation mode. Therefore, drivability can be improved.

While various embodiments of the disclosure have been described, the disclosure is not limited to these embodiments, but may adopt various constructions without departing from the scope and sprit of the disclosure. For example, the above-describe various control processes may also be accomplished in a hardware fashion and/or a software fashion. Furthermore, the air replenishment process, the hydrogen replenishment process, the hydrogen discharge process, and the anticipation-based activation process may be simultaneously executed in a possible construction. In another construction, an arbitrary process may be singly executed.

The invention claimed is:

1. A fuel cell system that generates electric power when supplied with hydrogen and oxygen, comprising:

a fuel cell stack including a hydrogen electrode and an oxygen electrode that are disposed at opposite sides of an electrolyte;

a hydrogen supplier portion that supplies hydrogen to the hydrogen electrode;

an oxygen supplier portion that supplies oxygen to the oxygen electrode;

an input portion that inputs a requested electric power;

a generation control portion configured to cause the fuel cell stack to generate an electric power corresponding to the requested electric power by controlling the oxygen supplier portion and the hydrogen supplier portion; and a non-generation-time control portion configured to stop a generation control performed by the generation control portion if the requested electric power is lower than or equal to a predetermined value, and configured to operate at least one of the oxygen supplier portion and the hydrogen supplier portion based on a predetermined condition regardless of the requested electric power.

2. The fuel cell system according to claim 1, wherein the non-generation-time control portion operates at least one of the oxygen supplier portion and the hydrogen supplier portion at a preset timing.

3. The fuel cell system according to claim 2, wherein the non-generation-time control portion operates the oxygen supplier portion at the present timing.

4. The fuel cell system according to claim 3, further comprising a hydrogen pressure detection portion that detects a pressure of hydrogen supplied to the hydrogen electrode, wherein the non-generation-time control portion controls the oxygen supplier portion so as to supply oxygen to the oxygen electrode if the pressure of hydrogen decreases by a predetermined amount from a hydrogen pressure level occurring when a generation control performed by the generation control portion is stopped.

5. The fuel cell system according to claim 2, further comprising a hydrogen pressure detection portion that detects a pressure of hydrogen supplied to the hydrogen electrode, wherein the non-generation-time control portion controls the oxygen supplier portion so as to supply oxygen to the oxygen electrode if the pressure of hydrogen decreases by a predetermined amount from a hydrogen pressure level occurring when a generation control performed by the generation control portion is stopped.

6. The fuel cell system according to claim 1, further comprising a voltage measurement portion that measures a voltage between a positive electrode and a negative electrode of the fuel cell stack,
wherein the predetermined condition is that the voltage is lower than or equal to a predetermined value.

7. The fuel cell system according to claim 6, wherein the non-generation-time control portion operates the oxygen supplier portion if the voltage becomes equal to or less than the predetermined value.

8. The fuel cell system according to claim 7, further comprising a hydrogen pressure detection portion that detects a pressure of hydrogen supplied to the hydrogen electrode, wherein the non-generation-time control portion controls the oxygen supplier portion so as to supply oxygen to the oxygen electrode if the pressure of hydrogen decreases by a predetermined amount from a hydrogen pressure level occurring when a generation control performed by the generation control portion is stopped.

9. The fuel cell system according to claim 6, further comprising a hydrogen pressure detection portion that detects a pressure of hydrogen supplied to the hydrogen electrode, wherein the non-generation-time control portion controls the oxygen supplier portion so as to supply oxygen to the oxygen electrode if the pressure of hydrogen decreases by a predetermined amount from a hydrogen pressure level occurring when a generation control performed by the generation control portion is stopped.

10. The fuel cell system according to claim 1, further comprising a hydrogen pressure detection portion that detects a pressure of hydrogen supplied to the hydrogen electrode, wherein the non-generation-time control portion controls the oxygen supplier portion so as to supply oxygen to the oxygen electrode if the pressure of hydrogen decreases by a predetermined amount from a hydrogen pressure level occurring when a generation control performed by the generation control portion is stopped.

11. The fuel cell system according to claim 1, further comprising a hydrogen pressure detection portion that detects a pressure of hydrogen supplied to the hydrogen electrode, wherein the predetermined condition is when the pressure of hydrogen is lower than or equal to a predetermined value.

12. The fuel cell system according to claim 11, wherein the non-generation-time control portion operates the hydrogen supplier portion if the pressure of hydrogen becomes equal to or less than the predetermined value.

13. The fuel cell system according to claim 12, wherein the non-generation-time control portion controls the oxygen supplier portion so as to supply oxygen to the oxygen electrode if the pressure of hydrogen decreases by a predetermined amount from a hydrogen pressure level occurring when a generation control performed by the generation control portion is stopped.

14. The fuel cell system according to claim 11, wherein the non-generation-time control portion controls the oxygen supplier portion so as to supply oxygen to the oxygen electrode if the pressure of hydrogen decreases by a predetermined amount from a hydrogen pressure level occurring when a generation control performed by the generation control portion is stopped.

15. The fuel cell system according to claim 1, further comprising a power increase anticipation portion that anticipates an increase in the requested electric power, wherein the predetermined condition is when an increase in the requested electric power is anticipated.

16. A mobile unit capable of moving by an electric motor that is driven by a fuel cell system as an energy source, comprising:
a fuel cell system, the fuel cell system comprising:
a fuel cell stack including a hydrogen electrode and an oxygen electrode that are disposed at opposite sides of an electrolyte;
a hydrogen supplier portion that supplies hydrogen to the hydrogen electrode;
an oxygen supplier portion that supplies oxygen to the oxygen electrode;
an input portion that inputs a requested electric power to drive the motor; and
a generation control portion configured to cause the fuel cell stack to generate an electric power corresponding to the requested electric power by controlling the oxygen supplier portion and the hydrogen supplier portion;
a power increase anticipation portion configured to anticipate an increase in the requested electric power; and
a non-generation-time control portion configured to stop a generation control performed by the generation control portion if the requested electric power is lower than or equal to a predetermined value, and configured to operate at least one of the oxygen supplier portion and the hydrogen supplier portion regardless of the requested electric power if the increase is anticipated.

17. The mobile unit according to claim 16, wherein the power increase anticipation portion anticipates the increase based on at least one of an operation of an operating portion related to acceleration or deceleration of the mobile unit, a prediction related to a route of the mobile unit, and an acceleration that acts on the mobile unit in a direction transverse to a traveling direction of the mobile unit.

18. A control method for a fuel cell system that generates electric power when supplied with hydrogen and oxygen, comprising:
providing a fuel cell system, the fuel cell system comprises a fuel cell stack including a hydrogen electrode and an oxygen electrode that are disposed at opposite sides of an electrolyte, a hydrogen supplier portion that supplies hydrogen to the hydrogen electrode, and an oxygen supplier portion that supplies oxygen to the oxygen electrode;

inputting a requested electric power;

causing the fuel cell stack to generate an electric power corresponding to the requested electric power by controlling the oxygen supplier portion and the hydrogen supplier portion;

stopping electric power generation by the fuel cell stack if the requested electric power is lower than or equal to a predetermined value; and operating at least one of the oxygen supplier portion and the hydrogen supplier portion based on a predetermined condition regardless of the requested electric power after the electric power generation is stopped.

* * * * *